US005401060A

United States Patent [19]

Chang et al.

[11] Patent Number: 5,401,060

[45] Date of Patent: Mar. 28, 1995

[54] DOCUMENT WITH HEAT AND PRESSURE SENSITIVE CHROMOGENTIC COMPOSITION THEREON

[75] Inventors: John C. H. Chang, Naperville; Richard H. Johnson, Lemont, both of Ill.

[73] Assignee: Wallace Computer Services, Inc., Hillside, Ill.

[21] Appl. No.: 75,419

[22] Filed: Jun. 14, 1993

[51] Int. Cl.$^6$ ........................ B42D 15/10; B41M 5/28; B32B 3/16

[52] U.S. Cl. ........................................ 283/95; 283/57; 283/94; 283/114; 427/145; 428/199; 428/321.5

[58] Field of Search .................................... 283/57-59, 283/94-96, 114, 900-902; 106/22 R, 23 R, 23 C; 427/258, 259, 288, 145; 428/195, 199, 206, 207, 321.5, 913, 914

[56] References Cited

U.S. PATENT DOCUMENTS

| | | | |
|---|---|---|---|
| 2,929,736 | 3/1960 | Miller et al. | 428/913 X |
| 3,713,861 | 1/1973 | Sharp | 117/15 |
| 3,829,133 | 8/1974 | Smagala-Romanoff | 283/6 |
| 4,037,007 | 7/1977 | Wood | 428/199 |
| 4,109,047 | 8/1978 | Fredrickson | 428/307 |
| 4,140,733 | 2/1979 | Meyer, Jr. et al. | 260/897 B |
| 4,175,774 | 11/1979 | Tonges et al. | 283/6 |
| 4,183,989 | 1/1980 | Tooth | 428/195 |
| 4,186,020 | 1/1980 | Wachtel | 106/22 |
| 4,197,346 | 4/1980 | Steven | 428/914 X |
| 4,210,346 | 7/1980 | Mowry, Jr. et al. | 283/8 B |
| 4,303,307 | 12/1981 | Tureck et al. | 350/276 R |
| 4,360,548 | 11/1982 | Skees et al. | 428/29 |
| 4,425,386 | 1/1984 | Chang | 427/256 |
| 4,726,608 | 2/1988 | Walton | 283/96 |
| 4,839,396 | 6/1989 | Tusim | 521/88 |
| 4,846,502 | 7/1989 | Chang et al. | 283/57 |
| 4,873,219 | 10/1989 | Brown et al. | 428/913 X |
| 5,132,034 | 7/1992 | Hsu et al. | 252/47.5 |
| 5,212,219 | 5/1993 | Griffin | 524/17 |

FOREIGN PATENT DOCUMENTS

| | | |
|---|---|---|
| 2722427 | 5/1977 | Germany . |
| 2913321 | 4/1979 | Germany . |
| 1520919 | 12/1975 | United Kingdom . |
| 9100390 | 1/1991 | WIPO . |

OTHER PUBLICATIONS

Research Disclosure (No. 187), Nov. 1979, pp. 638-639.

*Primary Examiner*—Peter Dungba Vo

*Attorney, Agent, or Firm*—Roylance, Abrams, Berdo & Goodman

[57] ABSTRACT

A pressure and heat-sensitive composition comprising chromogen-containing pressure-rupturable microcapsules and heat-sensitive color developer useful for verification of document authenticity system when applied as a localized coating on documents, such as checks and prescriptions. Quickly striking the chromogenic composition with a fingernail or blunt object to generate pressure and heat in the coating produces a colored image by friction. The chromogenic composition possesses a fugitive characteristic, whereby the colored image gradually disappears and can be made to reappear when the chromogenic coating is again subjected to external pressure and heat. This feature can be used for repeated verification of the authenticity of the document.

30 Claims, 3 Drawing Sheets

DOCUMENT WITH HEAT AND PRESSURE SENSITIVE CHROMOGENTIC COMPOSITION THEREON

CROSS-REFERENCE TO RELATED APPLICATIONS

Reference is hereby made to U.S. applications Ser. No. 07/987,710, entitled "Heat Sensitive System and Use Thereof" to John C. H. Chang filed Dec. 9, 1992, now pending, Ser. No. 07/987,694, entitled "Hidden Entry System and Use Thereof" to John C. H. Chang and Peter A. Walter filed Dec. 9, 1992, now U.S. Pat. No. 5,344,191, and Ser. No. 08/075,420, filed Jun. 14, 1993, entitled "Pressure-Sensitive Verification System and Use Thereof" to John C. H. Chang, now pending, the disclosures of which are hereby incorporated by reference.

FIELD OF THE INVENTION

The present invention is directed to a pressure and heat-sensitive chromogenic system which is activatable using a combination of pressure and heat. More particularly, this invention relates to documents having a localized, pressure and heat-sensitive chromogenic coating that can be activated by application of both pressure and heat to produce a visible colored mark for determining authenticity of the document.

BACKGROUND OF THE INVENTION

Various methods of providing documents, such as negotiable instruments, with tamper evident systems to prevent alteration have been proposed. Likewise, systems have also been developed to prevent reproduction of documents by photocopying to reduce the incidence of fraud. However, in recent years advanced color copiers which are readily accessible to the general public can produce nearly exact duplicates of the original document. It is very difficult for the untrained person to distinguish the original from an illicit reproduction. To prevent passing off of the reproduction as the original, efforts have been made to make the original document incapable of being copied or to incorporate authenticating systems into the document.

More recently, a system for document verification has been developed, which system is disclosed in co-pending U.S. application Ser. No. 07/987,710, to John C. H. Chang entitled "Heat Sensitive System and Use Thereof", and involves use of a heat-sensitive chromogenic system in the production of documents to prevent unauthorized or fraudulent use of a xerographic color copier for reproduction of negotiable instruments, such as checks, money orders and the like. When, for example, a check bearing the heat-sensitive chromogenic coating in a verification area thereof is presented for payment, the bank teller can simply apply heat to the verification area, and if a visible image symbol appears in the verification area, the teller will know that the check is an original. In such heat-sensitive record system, a heat-sensitive color developer is coated on the upper surface of the substrate. By subjecting the coating to a heat source or contacting the coating with a heated object, a visible colored mark is instantly produced. This system requires heat which melts or softens the heat-sensitive color developer without external pressure.

Laser printers in the form of desk models to computer-linked high speed models have been increasingly employed to upgrade office equipment for processing documents. Laser printers rely on toner to provide printed indicia on the documents. In order to adhere toner on the documents, heat is provided within the laser printers to melt and set toner on the surface of the documents. While there are many models of laser printer by numerous manufacturers, the heated surface of the fuser roll is at a temperature of, for example between about 350° F. to about 400° F. When a document is fed into the laser printer, the temperature of the surface directly contacting the fuser roll could approach 400° F. and the opposite surface could reach about 200° F. Thus, a document bearing a heat-sensitive verification system could become prematurely fully colored, thereby destroying the verification system for such document.

Accordingly, a need still exists for a simple and efficient system which is able to accurately authenticate a document and distinguish it from a reproduction even after it has received printed indicia from a laser printer.

SUMMARY OF THE INVENTION

A heat resistant document authentication system has now been discovered which can be used to identify an illicit reproduction of a document, such as a negotiable instrument, a pharmaceutic prescription, redeemable coupon, or the like, which system comprises paper bearing a localized, pressure and heat-sensitive coating of a chromogenic composition for producing a visible colored image by application of heat. Surprisingly, a heat-resistant, autogenous, chromogenic composition has been discovered comprising (a) chromogen-containing microscopic pressure-rupturable capsules, and (b) a solid, heat-sensitive color developing material, which, when subjected to the temperatures encountered by a document passing through a laser printer will not form a visible colored image. However, when a coating of the autogenous, chromogenic composition of the present invention is subjected a combination of external pressure and heat, such as the frictional heat and pressure resulting from quickly scraping a human fingernail or stylus across a coating of such chromogenic composition, such combination of external pressure and heat causes the chromogenic material to be released from said microcapsules and react with said heat-sensitive, color developer material to produce a visible colored image.

Thus, in contrast to a pressure-sensitive autogenous, chromogenic system, such as disclosed in Chang U.S. Pat. No. 4,425,386, the heat and pressure-sensitive chromogenic system of the present invention, rupture of the chromogen-containing microcapsules, alone, will not produce a visible color marking at ambient temperatures. Also, unlike the heat-sensitive system described in Chang U.S. Patent Application Ser. No. 07/987,710, heat alone will not produce a visible color marking in the chromogenic system of the present invention. Rather, the chromogenic system of the present invention is activated only when a combination of external pressure and heat are applied. Unlike previously proposed verification systems, this requirement of both external pressure and heat to activate the coating prevents premature coloration in documents bearing a coating of the chromogenic system of the present invention when passing through a laser printer. This is a very important feature of verification systems of the present invention.

In addition, coatings of the chromogenic system of the present invention have another surprising characteristic not found in pressure or heat-sensitive chromogenic coatings. When coatings of the chromogenic system of the present invention are subjected to external pressure and heat to develop a visible colored mark or image, the visible color gradually fades away to a faint or invisible mark within about a short time period, for example, 30 minutes to a few days, depending on the particular chromogen used. This "fugitive" feature of the present system is particularly important when used in verifying authenticity of documents. Thus, for example, a negotiable instrument, such as a check, can be presented to a bank teller, and the teller can scrape the coating of the present invention in a verification area on the check with a fingernail or other suitable stylus to generate the required external pressure and heat through the friction generated, resulting in a visible colored mark verifying authenticity of the check. The mark will then gradually fade and no longer interfere with the appearance of the check. Subsequently, authenticity of the very same check can be verified by once again drawing a fingernail or other stylus across the chromogenic coating on the check. Such fugitive feature can provide repeated confirmation of the authenticity of the check if needed, and provides a further guard against unauthorized duplication of the check.

Thus, according to one embodiment of the present invention, an autogenous, chromogenic composition is provided, which comprises (a) microscopic pressure-rupturable capsules containing a chromogen, and (b) a solid, heat-sensitive color developing material, such composition when coated onto a substrate is capable of forming a visible, colored image under application of both external pressure and heat, and, further, is capable of repeated activations to form a visible colored image under repeated application of external pressure and heat to the same area of the coating.

According to another embodiment of the present invention, a verification system is provided comprising a document having a support bearing at least one authentication area for verifying authenticity of the document, the authentication area comprising a localized heat and pressure-sensitive chromogenic composition, said chromogenic composition comprising (a) chromogen-containing microscopic pressure-rupturable capsules, and (b) a solid, heat-sensitive color developing material, such that when a combination of external pressure and heat is applied to the authentication area, such as by rubbing or striking a human fingernail or other friction-providing stylus, the chromogenic material is released from the microcapsules and reacts with said heat-sensitive, color developer material to produce a visible colored image. Thus, the verification system of the present invention reveals illicit reproductions of the authentic document, and since the present system is not pressure-sensitive, alone, premature verification is avoided by subjecting the document to laser printer temperatures, as well as ordinary writing and handling pressures. Thus, while the pressure and heat activated coating of the present invention may be subjected to ordinary writing pressures without producing the desired visible colored image before verification is required, application of the pressure and heat provided by applying, for example the friction of a human fingernail, will result in a visible colored image.

According to a further embodiment of the present invention, a method of verifying authenticity of a document is provided, which comprises applying frictional heat to the verification area, such as by rubbing or striking a human fingernail across the chromogenic composition of the present invention to form a visible colored image, whereby the chromogenic composition is activated by the localized pressure and frictional heat supplied by the rubbing or striking. The expression "strike" or "striking" as used in the present application is in the sense that one strikes a match across a rough surface to generate frictional heat. In the present invention, striking or quickly moving the human fingernail or other frictional heat generating stylus across the chromogenic composition generates sufficient pressure and frictional heat to cause visible color formation.

According to another embodiment of the present invention, the color developer is coated onto and supported by finely divided inorganic particles to provide increased reactivity with the chromogen and more intense visible colored images for verification of the security document.

The visible colored image in the verification area can be by color contrast between the color of the principal image and the developed color of the chromogenic composition. Also, the visible colored image may be a solid coating in a regular or irregular form of the chromogenic composition such that verification is provided by striking the coating to produce a single line or repeatedly striking the coating to produce a group of lines or striking or otherwise heating the entire coating or any portion of the coating as desired.

According to another embodiment of the present invention, the chromogenic composition is applied in the form of a latent image message, such as the word "ORIGINAL" formed of a mixture of the chromogen-containing pressure-rupturable microcapsules and the color developer material. Alternatively, the latent image can be printed using a coating of the color developer material followed by a printed latent image message formed of a printed coating of chromogen-containing pressure-rupturable microcapsules to form the pressure and heat activated coating. Alternatively, the latent image message can be formed of a coating of chromogen-containing pressure-rupturable microcapsules followed by a printed latent image message formed of a printed coating of the color developer. By applying a combination of pressure and heat, e.g. by frictional heat by striking the coating with a fingernail, the chromogenic compound is released to react with the color developer to produce a visible, colored image in the form of the message. Of course, if a specific latent image message is not desired, a non-message coating of the chromogen containing microcapsules and the color developer material may be applied in a single layer or as separate coatings.

According to a further embodiment of the invention, the verification system comprises a support having an information area bearing a visible principal image and a localized verification area comprising a pressure and heat activated chromogenic composition for producing a visible colored image. A homogenous mixture of the chromogen-containing microcapsules and the color developer material form an autogenous coating. Of course, the components may be coated to provide a latent image message or as a solid coating when a fingernail or blunt instrument having a low heat conductivity is rubbed or struck quickly across the verification area to produce sufficient heat to provide a colored image.

According to a further embodiment of the present invention, the verification area is coextensive with the information area or principal image on the document. The verification area may be on the same side of the document as the principal image, or alternatively, on the opposite side of the document from the principal image. In an alternative embodiment, the verification area is on the opposite side of the principal image of the document and coextensive with the information area such that it is exposed to pressure when pressure is applied to the information area to supply additional information, such as filling out the amount of a check or money order or by signing the document. The pressures applied to the verification area by writing with a pen or typewriter generally do not produce sufficient frictional heat to activate the chromogenic composition and thus do not produce the colored image in the information area.

According to another embodiment of the present invention, the verification system is applied to a negotiable instrument where the principal image is a monetary amount, such as in the case of a check. In this embodiment, the verification area is contained in the endorsement area on the reverse side of the negotiable instrument. Thus, when the negotiable instrument is submitted for payment, the authenticity of the negotiable instrument can be verified by applying external pressure and heat, e.g., friction, to the verification area in the endorsement area of the negotiable instrument.

According to a further embodiment of the present invention, the verification area may be treated to conceal the latent image message. Despite use of a colorless or substantially colorless chromogenic verification system, light reflection can reveal the latent image message of the verification system. According to this embodiment of the invention, the latent image message is coated with a thin coating comprising pigment in a binder which conceals the latent image message without substantially reducing color development nor activation characteristics of the chromogenic composition. Alternatively, concealment of the latent image message of the chromogenic coating or the chromogenic coating itself may be accomplished by dot printing the verification area using conventional printing inks in any color other than that of the latent image. Application of the thin pigmented coating or dot printing is preferably accomplished after application of the chromogenic coating.

As used in the present application, the term "principal image" is defined as a visible image which is applied or present on the document in the information area in printed or written form.

In the embodiment of the present invention where the document is a negotiable instrument, such as a check, money order, etc., the principal image can be a monetary amount in numerical or written form, name of the financial institution, name of the payor or the payee. Likewise, the principal image can be all or a portion of the written material of the document which is subject to unauthorized reproduction and fraudulent passing off as the original document. Likewise, in the embodiment of the present invention where the document is a medical prescription, the principal image can be both preprinted matter and handwritten information.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF THE INVENTION

Figure 1:
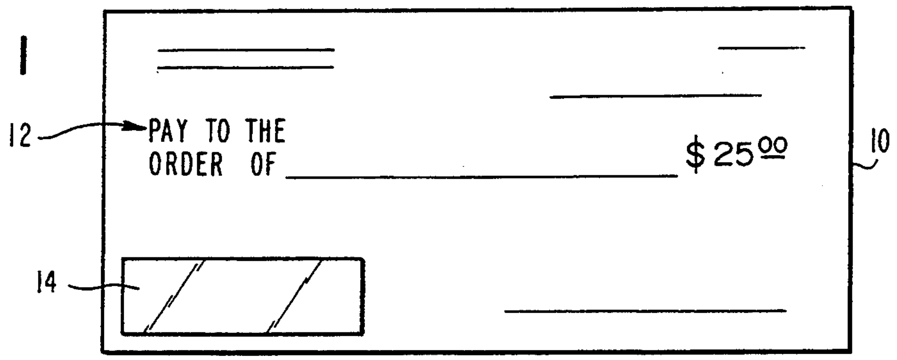
FIG. 1 is a front view of a negotiable instrument showing the verification area on the front face of the instrument.
Figure 2:
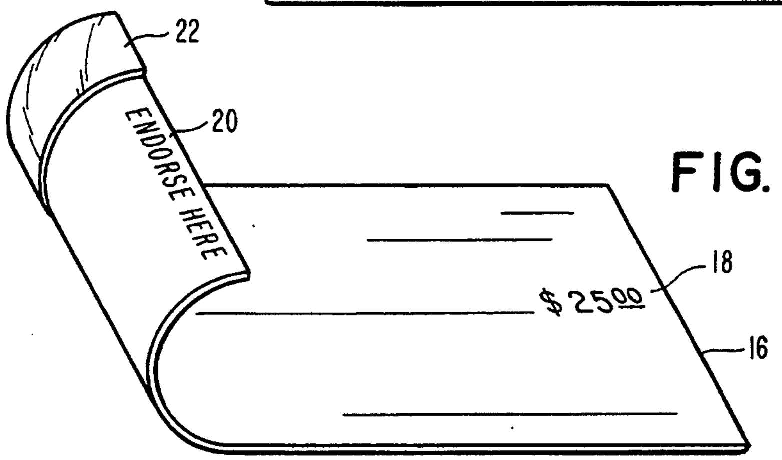
FIG. 2 is a schematic and perspective view of the negotiable instrument in the form of a check showing the endorsement area on the reverse side of the instrument with the verification area contained therein.

Referring to the drawings, FIGS. 1 and 2 illustrate the present verification system in combination with document 10, which in this embodiment is a bank check. Document 10 includes an information area 12 bearing a principal image and a verification area 14.

The term "document" as used herein is intended to include any type of document or paper which can be reproduced by a photocopier or other reproduction equipment. The documents of particular interest are those documents which have a high incidence of reproduction for fraudulent purposes. In preferred embodiments of the invention, the document is a negotiable instrument such as a money order or check including personal checks, cashier's checks and traveler's checks. In further embodiments, the document may include, for example, pharmaceutical prescriptions, contracts, letters, deeds, wills, bills of exchange, certificates of deposit, warrants, stocks, bonds, identification cards, lottery tickets, sweepstakes, raffles, prizes and awards. As used herein, the expression "negotiable instrument" refers to any instrument which can be exchanged for or represents a monetary amount or its equivalent value.

The information area 12 on the check of the embodiment of FIG. 1 is filled in with specific information at the time the check is issued in a manner similar to conventional check writing procedures. The information area will include, for example, such information as the date, the amount of the check, the name of the bank, the payee, the signature of the payor and the endorsement of the payee. The printed information contained in the information area comprises a principal image of the document. Such information can be applied to a check form by means of a laser printer, for example.

The verification area 14 in the embodiment of FIG. 1 is positioned in the lower left hand corner of the front face of the check in the area typically identified as "memo" for entering a personal reference by the person drawing the check. It is to be understood that the verification area may be located in any position or area on the check and that multiple verification areas may be present, such as on both the front and rear faces of the document. A localized coating of the pressure and heat activated, chromogenic composition is applied to the verification area, said coating comprising a) microscopic pressure-rupturable capsules containing a chromogenic material, and (b) a solid, heat-sensitive color developing material. If verification area 14 bearing the chromogenic coating of the present invention is subjected to a laser printer, a colored image would not appear in the verification area, since the heat-sensitive color developer remains isolated from the chromogen contained in the microcapsules.

Multiple localized heat activated coatings may be provided on the document at spaced positions to provide multiple verification areas or within a single verification area to provide multiple colors within a single verification area.

The pressure-rupturable microcapsules useful in the chromogenic system of the present invention may be formed in any suitable manner conventionally employed. For example, suitable pressure-rupturable microcapsules are described in U.S. Pat. No. 4,425,386 and U.S. Pat. No. 4,317,743 to Chang, the disclosures of which are hereby incorporated by reference.

The chromogen to be encapsulated may be any suitable chromogenic compound, such as crystal violet lactone, benzoyl leuco methylene blue, fluorans, phthalides, rhodamine lactams or the like, such as those disclosed in U.S. Pat. No. 4,424,386 to Chang and U.S. Pat. Nos. 3,954,803 and 4,012,419 to Vincent and Chang, the disclosures of which are hereby incorporated by reference. In preferred embodiments, the chromogen is colorless or substantially colorless before reacting with the color developer to produce the colored image. Suitable types of chromogenic compounds include diarylmethanes, triarylmethanes, indolylphthalides, azaphthalides, fluorans, and spiropyrans. Exemplary diarylmethanes include 4,4′-bis(dimethylamino-benzhydrylbenzyl)ether, N-halophenyl leuco auramine, and N-2,4,5-trichlorophenyl leuco auramine. Examples of triarylmethanes include 3,3-bis(p-dimethylaminophenyl)-6-dimethylaminophthalide and 3,3-bis(p-dimethylaminophenyl)phthalide. Examples of indolylphthalides include 3-(p-dimethylaminophenyl)-3-(1,2-dimethylindole-3-yl)phthalide and 3-(p-dimethylaminophenyl)-3-(2-methylindole-3-yl)phthalide. Examples of azaphthalides include 3-(2-ethoxy-4-diethylaminophenyl)-3-(1-octyl-2-methylindole-3-yl)-4-azaphthalide and 3-(2-ethoxy-4-diethylaminophenyl)-3-(1-ethyl-2-methylindole-3-yl)-4-azaphthalide. Examples of fluorans include 2-dibenzylamino-6-diethylaminofluoran, 2-anilino-6-diethylaminofluoran, 3-methyl-2-anilino-6-diethylaminofluoran, 2-anilino-3-methyl-6-(ethyl-isopentylamino)fluoran, 2-anilino-3-methyl-6-dibutylaminofluoran, 2-chloro-3-methyl-6-diethylaminofluoran, 3,6-dimethoxyfluoran, and 7,7′-bis(3-diethylaminofluoran). Examples of spiropyrans include 3-methylspirodinaphthopyran, 3-ethylspirodinaphthopyran, 3,3′-dichlorospirodinaphthopyran, 3-benzylspirodinaphthopyran, and 3-methylnaphtho-(3-methoxybenzo)spiropyran.

The chromogen is normally dissolved in a solvent, such as benzyl xylenes, diaryl alkanes, monobutylbiphenyls, monoisopropylbiphenyls, dibutylbiphenyls, di-isopropylbiphenyls, monoisopropylnaphthalenes, di-isopropylnaphthalenes, and hydrogenated terphenyls when encapsulated. The microcapsules may be of any suitable size, for example, and have an average diameter of between about 1 and about 20 microns, preferably, from about 3 to about 7 microns.

The preferred color developers are acidic compounds which have melting or softening points of about 40° C. to about 200° C. In preferred embodiments of the invention, the lower melting point developers having melting or softening points preferably from about 40° C. or 50° C. to about 110° C. or about 140° C., with from about 50° C. to about 100° C. being especially preferred so that the colored image is easily formed by applying frictional heat or similar low temperatures. The developer melting point should, however, be sufficiently high to avoid melting and thus premature activation and formation of the colored image during drying of the coating of the document. Examples of useful color developers include: 4,4′-isopropylidenediphenol, 4,4′-isopropylidene-bis(2-tert-butylphenol), 4,4′-sec-butylidenediphenol, 2,2′-methylene-bis(4-chlorophenol), phenol-formaldehyde novolak resin, alphanaphthol, betanaphthol, p-hydroxybenzyl benzoate, 3,5-dimethyl-4-hydroxybenzoic acid, 3-isopropylsalicylic acid, 3-benzylsalicylic acid, 3,5-di-tert-butylsalicylic acid, 1,5-di(4-hydroxyphenylthio)-3-oxapentane, 4-hydroxyphenyl-4′-isopropoxyphenylsulfone, bis(3-allyl-4-hydroxyphenyl)sulfone, 4,4′thiodiphenol, and 3,3′-dimethyl-4,4′thiodiphenol.

According to a preferred embodiment of the present invention, the effectiveness of the color developer is greatly enhanced by forming a coating of the color developer on finely divided inorganic particles having a melting point above the melting point of the particular color developer utilized. Thus, for example, a color developer compound, such as 4-hydroxy-4′-isopropoxydiphenylsulfone, is melted at a temperature of about 100° C. and mixed with finely divided inorganic particles of calcium carbonate in the form of a powder, having an average particle diameter in the range of from about one to about three microns and having a melting point of 825° C. The molten color developer coats and surrounds the individual inorganic particles to form color developer-coated particles in which the calcium carbonate particles act as a support for the color developer. The resulting particle mixture may be subjected to further grinding to break up lumps which may have formed during congealing of the molten color developer.

The resulting color developer compound-coated particles are surprisingly reactive when combined with the chromogen, and produce more intense, visible colored images than do color developers of the present invention which are not coated on finely divided inorganic particles. Any suitable inorganic pigment particle may be utilized as a support material for the color developer, so long as it has a melting point above the color developer being coated and does not possess an undesirable color or tint that would be visible in the resultant chromogenic coating. Suitable inorganic particles include, for example, calcium carbonate, clay, talc, barium sulfate, magnesium sulfate, aluminum oxide, zinc oxide or the like. The inorganic particles should be finely divided and have an average particle diameter in the range of, for example, from below about one micron to about 10 microns, preferably between about 0.8 and about 5 microns. Without limiting the invention to a particular theory or mechanism, it appears that the finely divided inorganic particles increase the reactive surface of the color developer deposited on the surface of the inorganic particle.

The proportions of chromogenic compound and color developer in the coating varies according to the required color density of the image. Generally, about 1 to 100 parts by weight, and preferably about 1 to 50 parts by weight, of color developer is used per part by weight of chromogenic compound to produce a colored image with sufficiently sharp contrast to readily distinguish the colored image from the principal image. If desired, however, the colored image may be the same as the principal image.

When the color developers have a high melting point, a heat-fusible material may be used in the chromogenic composition to lower the activation point or temperature of the color developer to facilitate the color development. Exemplary heat-fusible materials include stearic acid amide, stearic acid methylene bisamide, oleic acid amide, palmitic acid amide, coconut fatty acid amide, monoethanolamide of fatty acid, dibenzyl terephthalate, p-benzyl biphenyl, beta-naphthol benzyl ether, ethylene glycol-m-tolyl ether, di(p-chlorobenzyl) oxalate, di(p-methylbenzyl) oxalate, m-terphenyl, bis(2-(4-methoxy)(phenoxyethyl))ether, and dibenzyloxalate.

The chromogenic coating composition may also contain one or more inorganic or organic fillers, such as kaolin, talc, titanium dioxide, calcium carbonate, magnesium carbonate, barium carbonate, aluminum hydroxide, zinc oxide, silicone oxide, urea-formaldehyde resin, styrenemethacrylic acid copolymer, polystyrene resin, polycarbonate resin, polypropylene resin. The amount of filler used may vary depending on the chromogenic compound, developer and support material. The filler material is included as an extender material to reduce the amount of chromogenic compound and developer used and may be used to enhance the film-forming qualities of the chromogenic coating. The amount of filler material incorporated into the chromogenic coating composition should not substantially interfere with the development of the colored image.

A suitable binder material is needed to adhere the chromogen-containing pressure-rupturable microcapsules and the color developer onto the substrate. The amount of binder generally used is about 10% to about 50% by weight, and preferably about 15% to about 35% by weight, based on the total weight of the solids of the coating composition. Examples of useful binders include starch, hydroxyethyl cellulose, methyl cellulose, carboxymethyl cellulose, gelatin, casein, gum arabic, polyvinyl alcohol, styrene-maleic anhydride copolymers, ethylene-acrylic acid copolymers, styrene-butadiene copolymers, acrylonitrile-butadiene copolymers, vinyl acetate emulsions, ethylene-vinyl acetate emulsions.

The pressure and heat activated chromogenic composition of the present invention may optionally additionally contain a color suppressant to prevent premature coloration. The color suppressant must be so chosen that it will not inhibit or adversely affect the color formation in the final product. Examples are ammonium hydroxide, alkanolamines, such as monoethanol amine, diethanolamine, N, N-dimethylethanolamine, and the like, condensates of amine-formaldehyde, such as urea-formaldehyde, melamine-formaldehyde, and the like. Suitable amounts of such color suppressants include from about 0.1 to about 10, preferably from about 0.5 to about 4 percent by weight based on the total dry weight of the coating composition. Other suitable color suppressants are disclosed, for example, in U.S. Pat. Nos. 4,010,292 and 4,170,483, which are hereby incorporated by reference.

Preferably, an ultraviolet light absorbing compound is incorporated into the pressure-rupturable microcapsules along with the chromogenic compound when the pressure-rupturable microcapsules are coated on the verification area. Surprisingly, it was found that if prior to verification, a document of the present invention, such as a check or prescription form, is left uncovered, for example, left near a window in an automobile or near a window in a home, and the verification area becomes exposed to natural light, such as from sunlight or other source of ultraviolet light, the chromogenic material becomes inactive and the verification function of the document is destroyed in a day or so.

Thus, an individual presenting his or her paycheck to the bank for deposit or cash would be refused, since such check could not be verified. When the teller or bank official attempts to obtain color verification of the check by applying pressure and heat to the verification area, no colored image would result, since the chromogenic compound would remain colorless or substantially colorless. However, it has been found that by incorporating an ultraviolet light absorbing compound in the pressure-rupturable microcapsules along with the chromogenic compound, even after exposure to sunlight, the chromogenic compound can react with the color developer upon rupture of the microcapsules containing the chromogenic compound and application of heat.

Although an ultraviolet light absorbing compound has been incorporated in microcapsules used in the pressure-sensitive recording paper system disclosed in U.S. Pat. No. 3,554,781, such compound is used for a purpose different from that of the present invention. In particular, such recording paper system is concerned with preserving the visible image after it is formed by reaction of the chromogenic compound and color developer on the record sheet, since such sheets are not normally exposed to outside light, if at all, until after a colored image has been formed. Prior to use, such recording paper is stored in boxes or cabinets and is not exposed to sunlight. In contrast, the verification area on the personal checks, prescriptions or other documents of the present invention may well be exposed to daylight, since such document must be taken by the payee or patient, respectively, to a bank or drugstore to be negotiated. Thus, use of the ultraviolet light absorbing compound as used on the documents of the present invention preserves the integrity of the verification area of the documents by protecting the chromogenic compound in the capsule prior to reaction, rather than after it has reacted with the color developer to form a colored marking on a record sheet.

Any suitable ultraviolet light absorbing compound may be encapsulated along with the chromogenic compound of the present invention. Preferred ultraviolet light absorbing compounds for use in the present invention include, for example, the substituted benzotriazoles available from Ciba-Geigy under the tradename "Tinuvin", such as Tinuvin P disclosed in U.S. Pat. Nos. 3,004,896 and 3,189,615, which are hereby incorporated by reference, having the general formula 2-(5'-methyl-2'-hydroxyphenyl)benzotriazole; Tinuvin 326, which has the general formula 2-(5'-methyl-3'-tert-butyl-2'-hydroxylphenyl)-5-chlorobenzotriazole; Tinuvin 327, having the general formula 2-(3',5'-di-tert-butyl-2'-hydroxyphenyl)-5-chlorobenzotriazole; Tinuvin 328, which has the formula 2-(3',5'-di-tert-pentyl-2'-hydroxyphenyl)benzotriazole, and Tinuvin 900, disclosed in U.S. Pat. No. 4,278,589, which is hereby incorporated by reference, which has the formula 2-[2-hydroxy-3,5-di(1,1-dimethylbenzyl)phenyl]-2-H-benzotriazole.

The ultraviolet light absorbing compound is used in any suitable amount, for example, from about 5 to about 150 weight percent, based upon the weight of the chromogenic compound, with a preferred amount being from about 20 to about 80 weight percent, based on the weight of the chromogenic compound.

According to another embodiment of the present invention, it has been found that hindered phenols normally used as antioxidants to hinder thermally-induced oxidation of polymers in coatings for high temperature applications, for example, to prevent yellowing caused by heat, act as stabilizers for the chromogen in the capsules. The hindered phenols can be used in place of the benzotriazole ultraviolet light absorbing compounds. Surprisingly, it has been found that hindered phenols stabilize chromogen in the microcapsules when exposed to sunlight even at ambient temperatures.

Suitable hindered phenols include, but are not limited to, for example, 2,6-di-tert-butyl-p-cresol; 4,4'-methylene bis(2,6-di-tert-butylphenol); 4-methyl-2,6-bis(2'-hydroxy-3'-tert-butyl-5'-methylbenzyl)phenol; the Irganox hindered phenols, such as Irganox 129, Irganox 245, Irganox 1010, Irganox 1076, Irganox 1035 and Irganox MD 1024 commercially available from Ciba-Geigy Corporation. Such hindered phenols have the general structural formula

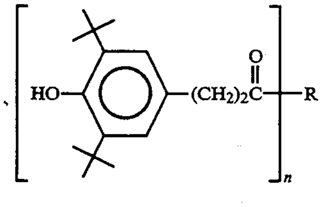

wherein R is an alkoxy, a substituted alkoxy, or —NH—NH-group and n is an integer from 1 to 4. For example, R is $C(CH_2O—)_4$ when n=4, R is $—O—C_{18}H_{37}$ when n=1, R is $—O—(CH_2)_2—S—(CH_2)_2—O—$ when n=2, and R is —NH—NH— when n=2.

Irganox 129 is 2,2'-ethylidene-bis(4,6-di-tertbutylphenol); Irganox 245 is ethylene bis(oxyethylene)bis(3-tert-butyl-4-hydroxy-5-methylhydrocinnamate); Irganox 1010, which is identified as tetrakis[methylene-3-(3',5'-di-tert-butyl-4'-hydroxyphenyl)propionate]methane; Irganox 1076 is octadecyl 3,5-di-tert-butyl-4-hydroxyhydrocinnamate; Irganox 1035 has the general formula

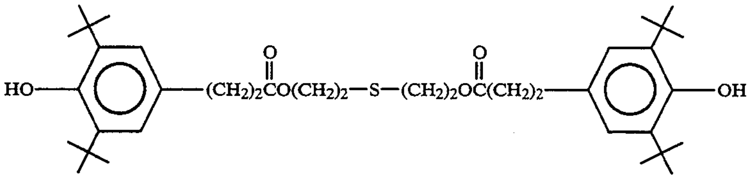

while Irganox MD 1024 has the general formula

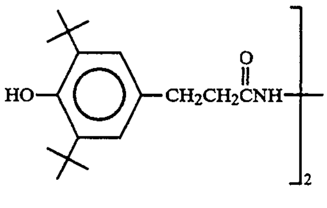

Any hindered phenol useful as an antioxidant is useful as a stabilizer for the chromogen in the capsules of the present invention. The hindered phenol stabilizer is used in any suitable amount, for example, from about 5 to about 150 weight percent, based upon the weight of the chromogenic compound, with a preferred amount being from about 20 to about 80 weight percent based on the weight of the chromogenic compound. Surprisingly, it was found that the hindered phenol can be used in place of a benzotriazole and still provide effective stability for the chromogen in the capsules.

The chromogenic coating composition may be prepared by a number of methods as known in the art. A suitable method of preparing the coating composition is to disperse the color developer into a volume of water as a dispersing medium. The color developer is generally ground for about one hour to a particle size in the range of about 1 to about 10 microns in diameter and may be ground in the presence of dispersants or binders. Examples of suitable dispersants include sodium dioctylsulfosuccinate, sodium dodecylbenzene sulfonate, alginates and fatty acid metal salts. The binder material may also function as a protective colloid to disperse the color developer. The chromogen-containing pressure rupturable microcapsules and the color developer may be mixed together and applied as one coating or prepared as separate coating compositions and applied in layers as discussed hereinafter in greater detail.

The verification area comprising the localized coating of a chromogenic composition may be treated so as to conceal location of the latent image message, since light reflection can reveal location of the message of the verification system. Thus, the latent image message can be coated with a thin coating comprising pigment in binder which conceals the latent image message without substantially reducing heat activated color development or heat activation characteristics of the chromogenic coating. A suitable coating may comprise, for example, inorganic fillers, such as calcium carbonate, titanium dioxide, talc, clay, or the like, in a polyvinyl alcohol solution. The thin coating provides the same texture to the support as the coating forming the latent image message and, thus, effectively conceals the message. Alternatively, concealment of the latent image message of the chromogenic coating may be accomplished by dot printing the latent image message or the entire surface of the document including the verification area using conventional printing inks in any color other than that of the latent image. Since the chromogenic composition is colorless, but contains a pressure-rupturable element, the pigmented coating or dot printing is preferably applied after application of the chromogenic composition coating to the substrate.

The chromogenic coating composition is applied to the substrate, for example, paper, plastic, or the like, which forms the document by any suitable technique as known in the art. The entire substrate may be coated although in preferred embodiments a localized, spot or band coating is used. The coating may be coextensive with the information area and the principal image since the coating is nonpressure sensitive and not affected by the pressure applied when the document is printed or written on such as by a pen to supply additional information. In one embodiment of the invention, the chromogenic coating composition is prepared as a slurry comprising the chromogen-containing pressure-rupturable microcapsules and the color developer. A preferred method of coating is by off-set gravure coating as disclosed in U.S. Pat. No. 4,425,386 to Chang which is hereby incorporated by reference. Alternative preferred coating methods include flexographic, screen printing, nozzle extrusion and ink jet printing.

Preferably, the chromogenic coating material is activated by quickly rubbing a blunt implement across the verification area to generate sufficient frictional pressure and heat to produce a colored image. For convenience, a suitable implement may be a human fingernail rubbed quickly across the verification area to generate pressure to rupture the microcapsules and release the chromogen, as well as frictional heat to cause reaction between the chromogen and color developer, and produce a colored line. Other implements which may be used include a non-writing end of a pen, a stylus, paper clip, coin and the like. Generally, metal objects are not as effective in producing a colored image since the metal conducts the frictional heat quickly away from the point of contact and has a lower friction coefficient than many other objects. Thus, a fingernail or plastic object is generally preferred.

However, any suitable means for applying sufficient pressure and heat, whether frictional or otherwise, can be used to heat the chromogenic composition and produce a visible colored image. Such means should be capable of rupturing the microcapsules and heating the color developer in the chromogenic composition to a temperature of between about 40° C. to 200° C., preferably between about 40° C. or 50° C. to about 110° C. or 140° C., with between about 50° C. and about 100° C. being especially preferred for certain applications. Although it is preferred to activate the chromogenic coating material by simultaneously applying pressure and heat, such as by applying frictional heat and pressure with a fingernail or other stylus, application of pressure and heat may be conducted sequentially by application of external pressure followed by application of heat. Thus, for example, the verification area may be impacted with an unheated object, such as a typewriter key and an impact printer key, or embossed with an unheated device to rupture the capsules. The chromogen is released and in direct contact with the color developer without color formation at this time. The verification area may then be subjected to heat from a heat source, such as a heated light bulb, to promote color development.

Figure 3:
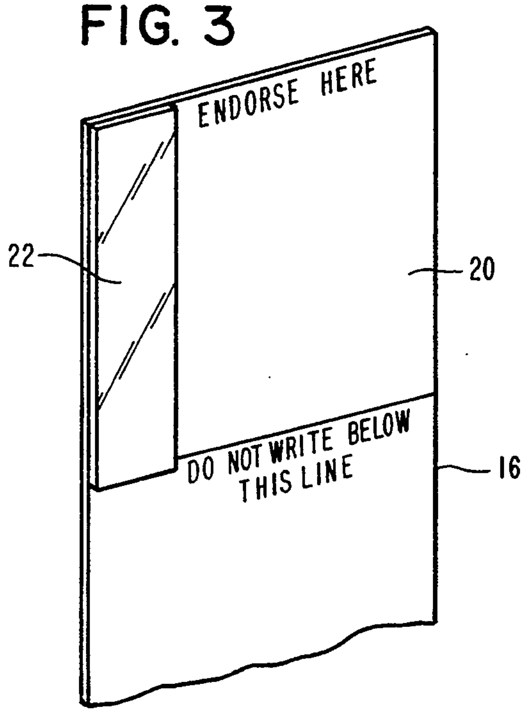
FIG. 3 is a schematic and perspective view of the check of FIG. 2 in accordance with a preferred embodiment of the invention.

In a further embodiment illustrated in FIGS. 2 and 3, a document in the form of a check 16 comprises an information area 18 having a principal image. The principal image in the information area 18 contains a conventional printed image as in the embodiment of FIG. 1. Also included on the check of this embodiment is a designated endorsement area 20 on the back face of the check opposite the principal image. The endorsement area 20 defines the area at one end of the check for the payee's endorsement. As shown in FIG. 3, the endorsement area includes a pre-printed principal image providing instructions for the person endorsing the check according to standard banking procedures. In the left portion of the endorsement area as shown in FIG. 3 is a verification area 22 comprises a coating of a homogenous mixture of the chromogen-containing pressure-rupturable microcapsules and the color developer to form an autogenous chromogenic coating. In this manner, the verification area is in a handy position next to the endorsement area of the check. Thus, if the check is submitted for payment, the person receiving the check can verify authenticity of the check by quickly rubbing their fingernail or other hard object across the verification area adjacent the signature to produce the colored image. Since the chromogenic coating is not sensitive to pressure alone, endorsement, alone, will not activate the coating and produce a visible color.

Verification area 22 can be, for example, a solid, regular shaped coating in the form of a rectangle, as shown, which provides a single visible colored line when a fingernail is used to rub or strike a line across the surface of the coating to generate frictional heat in the coating. Alternatively, rectangular verification area 22 may be formed of multiple chromogenic coatings, for example, three rectangular-shaped chromogenic coatings, each rectangular coating providing a different color when frictional heat is applied. Thus, when the fingernail or other stylus is quickly drawn across and in contact with area 22, a line composed of, for example, blue, green and red segments results.

The verification system of the invention provides an effective and simple way of preventing fraudulent passing off of a reproduction of an original document. The chromogenic coating of the present invention is colorless until activated and, thus, it would not be apparent to the would-be forger that the original contains the chromogenic coating forming the verification system. Although advanced copiers are able to make copies which are virtually indistinguishable to the naked eye, the photocopier cannot reproduce the chromogenic coating. Thus, when the lawbreaker presents the photocopied document, authenticity of the document can be quickly verified by application of external pressure and heat, such as by rubbing a frictional heat generating implement, such as a fingernail or stylus, in the verification area to produce a colored image. In this manner, a document such as a check, money order or prescription, which is suspected of being a fraudulent copy, can be authenticated by a store clerk or bank teller without the need for specialized equipment or training. When a colored image appears in the area, the authenticity of the document is verified. Failure to produce a colored image indicates that the document is a copy and not the original.

As previously indicated, the chromogenic composition of the present invention has possesses a "fugitive"

characteristic in which following activation of the coating to produce a colored image by application of external pressure and heat, the visible colored image gradually fades away to become faint or invisible within a short time, for example, about 30 minutes to a few days, depending upon the particular chromogen used. Thereafter, the coating can be reactivated by application of external pressure and heat to produce a colored image once again on the same area of the coating at which the colored image had previously appeared. This phenomenon permits repeated verification of the authenticity of the document if further confirmation is needed with the appearance of the document returning to its original unactivated appearance each time.

Although it is not intended to limit the present invention to any particular theory or mechanism, the fugitive phenomenon may be explained by the following description.

Chromogens useful in the present invention are leuco dyes which are easily soluble in aromatic oil and remain colorless inside microcapsules. Once microcapsules are ruptured, the chromogen-containing oil is released. The heat-sensitive color developers are inactive at the ambient temperature. But, the heat provided from the striking force activates the color developers to react with chromogens, forming visible colored images. After the heat has dissipated, the functionality of color developers also diminishes allowing the colored form of chromogens to revert to colorless state in the surrounding aromatic oil. This explanation is further supported by the fact that by subjecting the coating of the present invention to pressure and heat at about 400° F. to produce a colored mark, the oil needed to encapsulate the chromogen is dispelled to the extent that the mark will not fade away. Also, when a finely divided solid chromogen (in the absence of aromatic oil) is used instead of pressure-rupturable chromogen-containing microcapsules, the visible colored mark developed by applying heat to the coating remains colored. Also, it is likely that the molecular structure of chromogen dictates the degree of "fugitive phenomenon". If the molecule possesses more oil soluble groups, such as higher alkyl groups and aryl groups, the chromogen molecule would revert from colored structure to colorless form easier than those possessing less oil soluble group, such as lower alkyl group, amino group, amide group, and carbamate group.

The chromogenic coating is colorless and remains nonreactive at room temperature without application of external pressure and heat. The chromogenic coating can therefore be located in any position on the document both without being noticeable and without premature activation with normal handling of the document. For example, the chromogenic coating of the present invention can be in an area of the document which is subjected to pressure by writing or endorsement without being conspicuous and without premature activation.

The chromogenic coating in the verification area in preferred embodiments is formed from at least one chromogenic compound and a color developer. The chromogenic compound and the color developer are activated by added pressure and heat to interact and react to produce the colored image. In the embodiments of FIGS. 1–3, the chromogen-containing microcapsules and the color developer are intimately mixed and applied to the information area as a uniform coating. In this manner, frictional heat and pressure applied by an object to any portion of the information area will produce a colored image in that portion only.

In the present invention, the chromogenic coating is a self-contained system comprising a solid acidic color developer compound co-reactant and a colorless or substantially colorless encapsulated chromogen. In preferred embodiments, the color developer has a melting or softening point of about 40° C. to about 200° C., preferably from about 40° C. or 50° C. to about 110° C. or 140° C., especially 50° C. to about 100° C., so as not to react with the chromogenic reactant at room temperature. Application of heat at temperatures in the range of 40° C. to about 200° C. softens or melts the color developer rendering it sufficiently reactive with the chromogenic compound and produce the distinct visible colored image in situ.

To have an eye catching result to verify authenticity of the document, for example, it may be desirable for the autogenous chromogenic coating to present a striking color contrast to that of the principal image. For example, the dollar amount of a check or the printed information on the check may be in black ink and the color developed by the autogenous coating can be red, violet, orange, green, blue, or yellow to obtain a high degree of contrast. Alternatively, the developed color can be coordinated with the requirements of the financial institution in the case of a check or money order, and may be, for example, the same color as the principal image. Of course, highly contrasting colors can be used, and multiple chromogenic coatings each producing a different colored visible image can be used in the verification area. Thus, for example, a red dot on a black rectangular background could be provided upon activation of the verification area.

Figure 4:
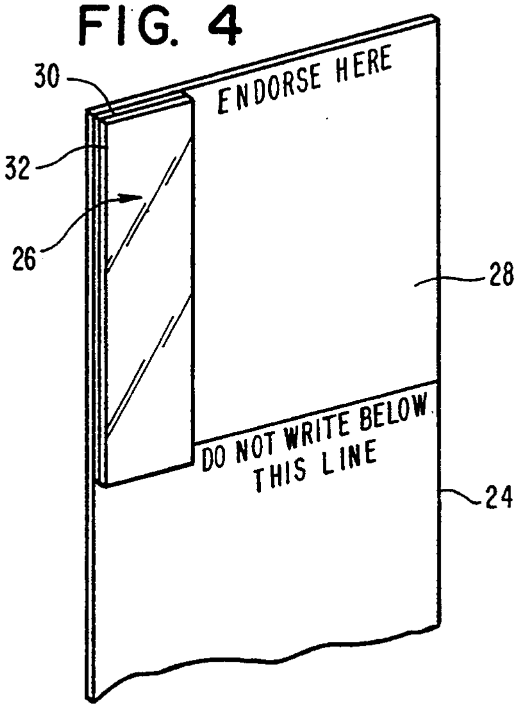
FIG. 4 is a partial, schematic and perspective view of the check of FIG. 2 modified according to one embodiment of the invention.

In a further embodiment illustrated in FIG. 4, the chromogenic composition is coated onto the document 24 within the verification area 26. The verification area 26 is shown adjacent the endorsement area 28 on the rear face of the check in a manner similar to the embodiment of FIG. 2. The endorsement area 28 includes indicia such as instructions to endorse within the endorsement area. In this embodiment, the chromogenic coating composition in the verification area is applied as a multi-layer coating within the localized area. In this embodiment, the color developer is applied to the substrate of the document as a first layer 30. A second layer 32 comprising chromogen-containing pressure rupturable microcapsules is coated over the first layer to provide the colored image forming coating system.

Verification area 26 may also include pre-printed indicia to provide instructions for use and operation of the verification system. For example, such instructions can read "Scratch here to have color appear—if no color appears, do not accept this document." The chromogenic coating in the verification area can be heat activated in a manner similar to the embodiment of FIG. 2, for example, by rubbing or striking the coating with a blunt object to provide frictional heat and produce the colored image, thereby verifying the document as an original. Likewise, any source of heat may be used to provide the desired activation temperature resulting in a colored image.

Alternatively, the chromogen-containing pressure-rupturable microcapsules can be applied first onto the substrate, according to the process described in the above-mentioned U.S. Pat. No. 4,425,386. The color developer are then coated onto or printed over the first coating. The color developer may be dissolved or dispersed in a vehicle such as a printing ink base, and the resulting solution printed onto the substrate.

Figure 5:
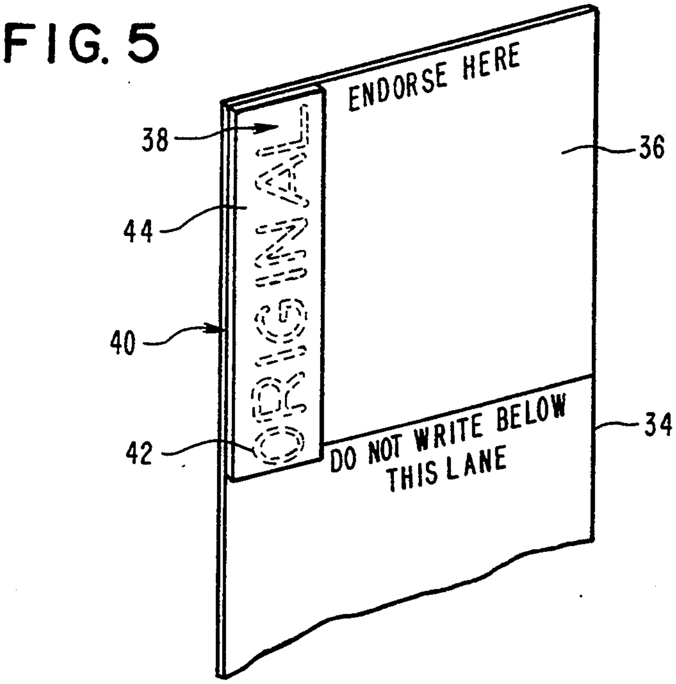
FIG. 5 is a partial, schematic and perspective view of the check of FIG. 2 having a latent image in the verification area.
Figure 6:
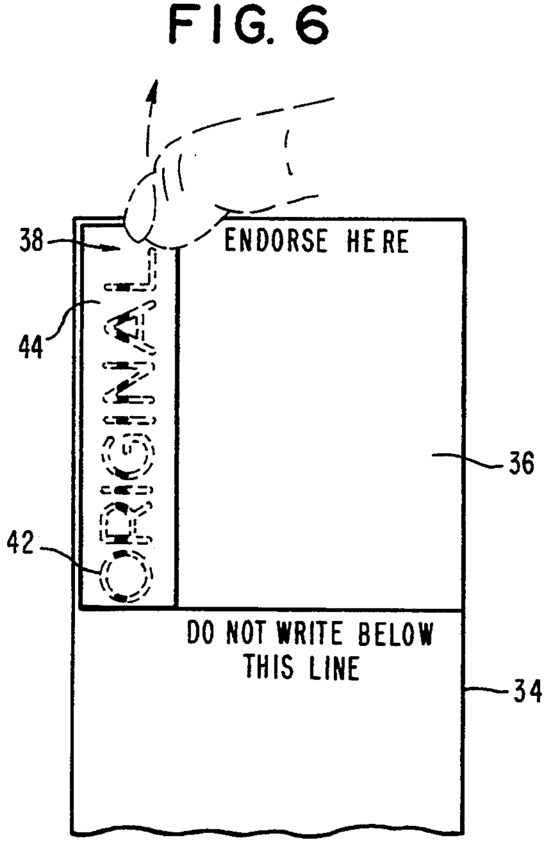
FIG. 6 is a partial, schematic and perspective view of the check of FIG. 5 after applying external pressure and heat by friction to a portion of the verification area.
Figure 7:
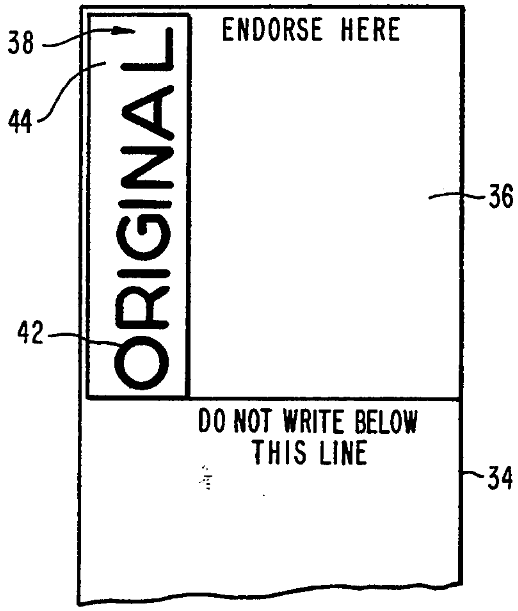
FIG. 7 is a partial, schematic and perspective view of the check of FIG. 5 having the colored image completely displayed to provide verification of the authenticity of the check.

In a further embodiment illustrated in FIGS. 5, 6 and 7, document 34 is a check including an endorsement area 36 having a verification area 38 comprising the autogenous chromogenic composition of the present invention as coating 40. The chromogen-containing pressure-rupturable micro-capsules are formed into a colorless ink and printed to form the word "ORIGINAL" or other alerting message 42 as a latent image on a layer comprising color developer 44, which had been previous coated on verification area 38, to form the image-forming chromogenic coating 40. In alternative embodiments, the color developer may be applied as the printed latent image message 42 followed by the chromogen-containing pressure-rupturable microcapsules as the coating 44. Although chromogen-containing microcapsules may be spot printed to form the latent image, it is generally preferred to produce the latent image from the color developer. Alternatively, the latent image may be formed from a mixture of the chromogen-containing pressure rupturable microcapsules and color developer and printed onto the endorsement area 36 to provide the latent image message of FIG. 5 as an autogenous, pressure and heat-sensitive message.

In use, authenticity of the check can be distinguished from a photocopy or other form of reproduction without the need for specialized equipment. The verification system is activated by applying external pressure and heat, such as by quickly rubbing the verification area with a human fingernail or other blunt object. A single stroke across the verification area 38 to apply sufficient pressure and frictional heat will cause the chromogenic compound to react with the color developer and to partially produce the colored image in the form of colored segments as shown in FIG. 6. Applying repetitive strokes across the verification area will cause the entire image 42 to develop as shown in FIG. 7.

In the embodiment of FIGS. 5–7, the latent image 42 is in the form of a word. In alternative embodiments, the latent image can be, for example, a business logo, design, diagram, serial number, combinations of numbers and letters, or other indicia capable of identifying the document.

Likewise, the latent image can be formed of a chromogenic composition which provides a different color from the background on which it is coated when activated. Thus, for example, the latent image word "ORIGINAL" in FIG. 5 could be formed by printing an autogenous chromogenic composition which forms a red visible image onto a background coating of a chromogenic composition which forms a black visible image. Thus, when a fingernail is quickly drawn across the coating in the manner of FIG. 6, the visible portions of the word would appear red, and the visible portions of the background would appear black, yielding a visible line with red and black segments. Also, if desired, the latent image may merely be a circular red image providing background. In other words, any desired configuration may be utilized.

Figure 8:
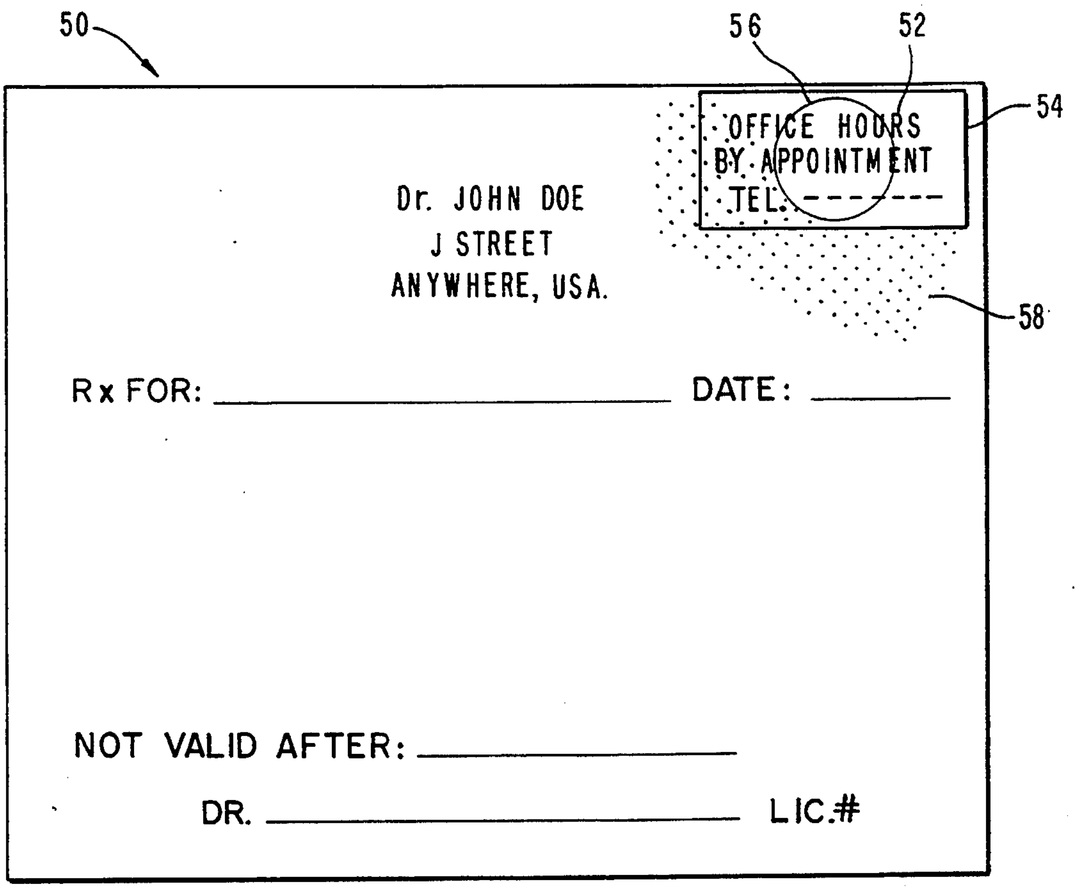
FIG. 8 is a front view of a prescription blank showing the verification area under printed matter in accordance with a preferred embodiment of the invention.

In the embodiment of FIG. 8, prescription form 50 is provided with printed matter 52 including the prescribing doctor's office hours and telephone number in verification area 54 which comprises a black color-producing autogenous chromogenic composition in the form of a solid rectangle. Within the rectangular-shaped coating 54 is a red-color producing autogenous chromogenic composition 56 in the form of a solid circle. Form 50 is coated with dot printing 58 of a printing ink solution which may be a white pigment coating applied to the entire surface of form 50 prior to printing of information, such as 52, to conceal the location of entire verification area 54. After prescription 50 is completed by the physician and presented at the drug store to be filled, the pharmacist or clerk may easily verify that it is an original rather than a reproduction, by applying heat locally to the verification area. Thus, if the clerk rubs or strikes a fingernail quickly across the center of the entire verification area 54, a multi-colored line, which is black, red, black in sequence, will result from the frictional pressure and heat, signifying that it is an original.

The invention will be further illustrated by the following example. It should be understood that it is not intended to limit the scope of this invention. The percentages are by weight unless otherwise specified.

EXAMPLE 1

A chromogenic material is prepared by mixing 28 grams of starch powder from Ogilvie Mills Ltd., 28 grams of melamine-formaldehyde condensate at 65 weight percent solids, and 50 grams (32.2 weight percent solids) of capsule slurry containing 1.0 gram of 3-diethylamino-7-dibenzylaminofluoran which is provided in the capsule.

A color developer dispersion is produced by grinding 118 grams of 4-hydroxy-4'-isopropoxydiphenylsulfone and 3.1 grams of a silicone defoamer in 110 grams of 5 weight percent polyvinylalcohol solution until a particle size of about 5 microns is obtained.

The chromogenic material and the color developer dispersion are than mixed to provide chromogenic coating composition. A spot is coated on the back side of a check proximate the endorsement area and dried to form a substantially colorless coating. The check is passed through a laser printer to provide payee and payment information. Inspection of the autogenous spot coating reveals no premature coloration from the heat of the laser printer on the chromogenic coating. The check is subject to impact pressure by stamping the date on the face side of the check opposite to the autogenous verification coating area. Again, no visible colored image is developed. Striking the coating with a fingernail immediately produces a green-colored line.

EXAMPLE 2

A chromogenic material is prepared by mixing 28 grams of starch powder from Ogilvie Mills Ltd., 28 grams of melamine-formaldehyde condensate at 65 weight percent solids, and 50 grams (32.2 weight percent solids) of capsule slurry containing 1.5 grams of Pergascript Red I-6B color former from Ciba-Geigy Corporation and 1.0 gram of Tinuvin 328 ultraviolet light absorber from Ciba-Geigy Corporation in the capsules.

In a beaker, 39.1 grams of 4-hydroxy-4'-isopropoxydiphenylsulfone and 78.2 grams of calcium carbonate are heated at about 100° C. with a mild mixing until a homogenous thin paste is obtained. The hot paste is slowly poured into a solution of 110 grams of 5 weight percent polyvinylalcohol and 3.1 grams of a silicone defoamer in an attritor. The mixture is ground in the attritor to reduce the particle size to about 5 microns to provide a color developer dispersion.

The chromogenic material and the color developer dispersion are then mixed together to produce a chromogenic coating composition. A spot is coated and dried on the face of a certificate. Thereafter, the certificate is printed with a laser printer to provide information. There is no premature coloration of the chromogenic spot coating from the heat of the laser printer. However, when the chromogenic spot coating is struck quickly with a fingernail, a red-colored line is produced.

While the document verification system of the present invention has particular application to documents that are subjected to the temperatures of a laser printer, it is apparent that the present document verification system may also be used for verification of the authenticity of documents which are not to be processed by a laser printer. Likewise, the chromogenic composition of the present invention may also be used to provide a hidden entry for purposes other than document verification. For example, the present composition may be used for providing a latent image on sweepstakes contest awards or lottery tickets in the manner disclosed in U.S. Patent Application Ser. No. 07/987,694 to Chang and Walter, the disclosure of which is hereby incorporated by reference.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification.

What is claimed is:

1. A document comprising:

a support having a first surface and a second surface, said first surface having a localized coating of a heat and pressure-sensitive chromogenic composition, said composition comprising:

(a) chromogen-containing microscopic pressure-rupturable capsules, and (b) a solid, heat-sensitive color developing material having a softening point of at least about 40° C.;

said localized coating of said capsules and said color developing material being formed from a mixture of said capsules and color developing material, from superposed coatings of said capsules and said color developing material, or from superposed printing and coating of said capsules and said color developing material, said chromogen and said color developing material reacting only under application of both external pressure and heat, said external pressure causing said capsules to rupture and release said chromogen and said external heat causing said heat-sensitive color developing material to soften and react with said chromogen to produce a visible colored image.

2. The document of claim 1, wherein said localized coating of said chromogenic composition is present in at least one verification area on said support for verifying authenticity of said document.

3. The document of claim 2, wherein said localized coating of said chromogenic composition comprises a substantially homogeneous mixture of said (a) chromogen-containing microscopic pressure-rupturable capsules, and (b) a solid, heat-sensitive color developing material.

4. The document of claim 2, wherein said support bears an information area having a visible principal image.

5. The document of claim 4, wherein said visible principal image includes a dollar amount.

6. The document of claim 1, wherein said verification area comprises a localized chromogenic composition in the form of a latent image message.

7. The document of claim 2, wherein said visible colored image will fade away within about thirty minutes to a few days.

8. The document of claim 7, wherein said localized coating can be repeatedly subjected to external heat and pressure and to produce a visible colored image.

9. The document of claim 1, wherein said heat-sensitive color developer comprises a color developer compound having a melting point in the range of about 40° C. to about 200° C.

10. The document of claim 9, wherein said color developer compound has a melting point in the range of about 40° to about 140° C.

11. The document of claim 1, wherein said microcapsules additionally contain an ultraviolet light absorbing compound.

12. The document of claim 11 wherein said ultraviolet light absorbing compound is a benzotriazole.

13. The document of claim 12 wherein said ultraviolet light absorbing compound is present in an amount of from about 5 to about 150 weight percent based upon the weight of said chromogen.

14. The document of claim 13 wherein said ultraviolet light absorbing compound is present in an amount of from about 20 to about 80 weight percent based upon the weight of said chromogen.

15. The document of claim 1 wherein said pressure-rupturable microcapsules additionally contain a hindered phenol to stabilize said chromogen.

16. The document of claim 1 wherein said hindered phenol antioxidant is Irganox 129, Irganox 245, Irganox 1010, Irganox 1035, Irganox MD 1024 or Irganox 1076.

17. The document of claim 16 wherein said hindered phenol is present in an amount of from about 5 to about 150 weight percent based upon the weight if said chromogen.

18. The document of claim 17 wherein said hindered phenol is present in an amount of from about 20 to about 80 weight percent based upon the weight of said chromogen.

19. The document of claim 1, wherein the combination of external pressure and heat are provided by frictionally applying a stylus.

20. The document of claim 1, wherein said color developing material comprises finely divided inorganic particles each substantially surrounded by a coating of a color developer compound, said inorganic particles having a melting point greater than that of said color developer compound.

21. The document of claim 20, wherein said particles have an average diameter in the range of between about 0.8 and about 5 microns.

22. The document of claim 20, wherein said inorganic particles are calcium carbonate, clay, talc, barium sulfate, magnesium sulfate, aluminum oxide or zinc oxide.

23. The document of claim 22, wherein said inorganic particles are calcium carbonate.

24. The document of claim 20, wherein said color developer compound has a melting point of between about 40° and about 200° C.

25. A paper coated with the chromogenic composition of claim 24.

26. The paper of claim 25, wherein said chromogenic coating comprises a localized coating.

27. The document of claim 20, wherein said color developing material is produced by melting said color developer compound, mixing said melted color developer compound with finely divided particles of said inorganic particle to surround and coat said particles, and grinding said coated particles.

28. The document of claim 1, wherein said document is a negotiable instrument, a pharmaceutical prescription blank or a redeemable coupon.

29. The document of claim 28, wherein said document is a pharmaceutical prescription blank.

30. The document of claim 1, wherein external heat is a temperature above ambient temperature.

* * * * *